(12) United States Patent
Kaminski et al.

(10) Patent No.: US 10,839,266 B2
(45) Date of Patent: Nov. 17, 2020

(54) DISTRIBUTED OBJECT DETECTION PROCESSING

(71) Applicant: Intel Corporation, Santa Clara, CA (US)

(72) Inventors: Maciej Adam Kaminski, Chandler, AZ (US); Amit Aneja, Chandler, AZ (US); Robert Mahieu, Scottsdale, AZ (US); Takeshi Kevin Yamane Musgrave, Ithaca, NY (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 15/941,899

(22) Filed: Mar. 30, 2018

(65) Prior Publication Data

US 2019/0050685 A1 Feb. 14, 2019

(51) Int. Cl.
| | |
|---|---|
| *G06K 9/00* | (2006.01) |
| *G06K 9/62* | (2006.01) |
| *G06T 3/40* | (2006.01) |
| *G08G 1/16* | (2006.01) |
| *B60W 30/09* | (2012.01) |

(52) U.S. Cl.
CPC ....... *G06K 9/6262* (2013.01); *G06K 9/00805* (2013.01); *G06K 9/6261* (2013.01); *G06T 3/40* (2013.01); *B60W 30/09* (2013.01); *B60W 2420/42* (2013.01); *G06T 2207/20021* (2013.01); *G06T 2207/20081* (2013.01); *G08G 1/167* (2013.01); *G08G 1/168* (2013.01)

(58) Field of Classification Search
CPC ............. B60W 2420/42; B60W 30/09; G06K 9/00805; G06K 9/6261; G06K 9/6262; G06T 2207/20021; G06T 2207/20081; G06T 3/40; G08G 1/167; G08G 1/168
See application file for complete search history.

(56) References Cited

U.S. PATENT DOCUMENTS

| | | | | |
|---|---|---|---|---|
| 6,058,209 | A * | 5/2000 | Vaidyanathan | .... G06K 9/00127 382/133 |
| 2006/0088207 | A1* | 4/2006 | Schneiderman | ... G06K 9/00241 382/159 |
| 2008/0309516 | A1* | 12/2008 | Friedrichs | ............... G06T 7/223 340/935 |
| 2009/0245649 | A1* | 10/2009 | Nakatsuka | ......... G06K 9/00248 382/195 |
| 2010/0021008 | A1* | 1/2010 | Shaick | ............... G06K 9/00255 382/103 |

(Continued)

*Primary Examiner* — Ian L Lemieux
(74) *Attorney, Agent, or Firm* — Schwegman Lundberg & Woessner, P.A.

(57) ABSTRACT

Various systems and methods for implementing distributed object detection processing are described herein. An object detection system includes a plurality of computer vision accelerators to process a respective plurality of portions of an input image and produce a list of detected objects in the respective plurality of portions of the input image; and a processor subsystem to: combine the list of detected objects from each of the plurality of computer vision accelerators, to produce a combined list of detected objects; sort the combined list of detected objects; and remove duplicate entries in the combined list of detected objects to produce an output list of detected objects.

21 Claims, 14 Drawing Sheets

(56) References Cited

U.S. PATENT DOCUMENTS

| | | | |
|---|---|---|---|
| 2013/0101230 A1* | 4/2013 | Holeva | B66F 9/122 382/202 |
| 2015/0170002 A1* | 6/2015 | Szegedy | G06K 9/66 382/156 |

* cited by examiner

DISTRIBUTED OBJECT DETECTION PROCESSING

TECHNICAL FIELD

Embodiments described herein generally relate to object detection systems, and in particular, to distributed object detection processing.

BACKGROUND

In the automotive context, advanced driver assistance systems (ADAS) systems are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

ADAS relies on various sensors that are able to detect objects. Examples of such sensors include visible light cameras, radar, laser scanners (e.g., LiDAR), acoustic (e.g., sonar), and the like. Some vehicles include multiple types of sensors for greater flexibility. As vehicles become more autonomous, implementing real-time sensing is critical to ensuring safe operation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
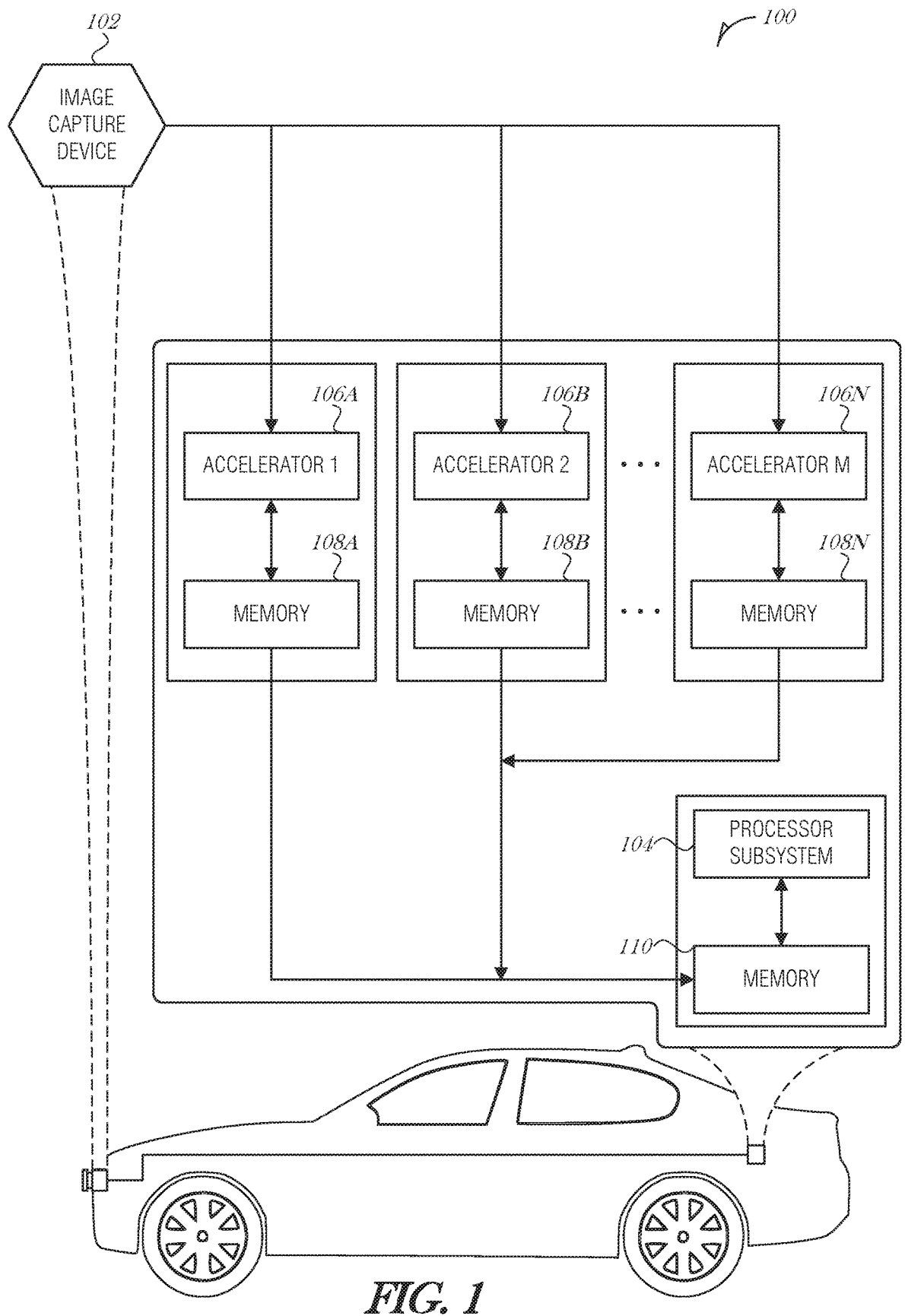
FIG. 1 is a schematic drawing illustrating a computer vision (CV) system, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Autonomous vehicles (AVs) typically include various forward, sideward, and rearward facing sensors in a vehicle. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

AVs may be partially or fully autonomous and may operate in a partial or full autonomous mode for some or all of the time. Partial autonomous mode may provide various collision avoidance, driver alert systems, lane change warnings, and the like. In contrast, full autonomous mode may relieve the driver from nearly all operational aspects. Modes may be changed during a driving session. For instance, a driver may operate an AV in partial autonomous mode while in the city, and then initiate full autonomous operation after reaching a stretch of highway.

Advanced driver assistance systems (ADAS) systems and other autonomous functions in an AV rely on various computer vision (CV) technologies. In general, CV is the technology field that includes processing images or video data to perform object detection, object recognition, object tracking, three-dimensional (3D) pose estimation, motion estimation, facial recognition, and other digital processing. The outputs of CV processing may be used for gesture detection, object detection, collision avoidance, or a plethora of other functions. For ADAS. CV processing is conventionally used for lane assist, collision avoidance and mitigation, pedestrian detection and tracking, speed limit tracking, adaptive cruise control, and the like.

CV entails a large amount of processing power. For instance, in a conventional single-accelerator CV system running deep learning object detection algorithm, the system is able to process a single video frame—depending on image resolution, complexity, or processing complexity of various techniques such as deep learning—in approximately 50 ms. Hence, the CV system is able to operate at 20 frames per second (FPS). These baseline performance metrics are not adequate throughput for some real-time ADAS to achieve the safety or performance expectations of designers or consumers.

In order to address this processing limitation, the present disclosure provides multi-accelerator CV system architectures. By splitting the processing of a video frame amongst several CV accelerators, the CV algorithm may be executed in parallel. The results of object detection, or other output from the CV algorithm, may then be combined to represent the results for the entire frame.

Thus, in an improved CV accelerator architecture, the host vehicle may be equipped a multi-CV accelerator system to detect objects around the host vehicle. This mechanism produces faster CV processing with substantially the same accuracy of results for object detection and tracking. Additional embodiments are described below with reference to the FIGS.

FIG. 1 is a schematic drawing illustrating a computer vision (CV) system 100, according to an embodiment. The CV system 100 includes an image capture device 102, a processor subsystem 104, and a plurality of CV accelerators 106A-N. While three CV accelerators 106A-N are illustrated in FIG. 1, it is understood that any number of two or more CV accelerators may be used. Although the CV system 100 is illustrated in an automotive context—additional details of which are described below with respect to FIG. 11—it may be equally applicable to security, unmanned aerial vehicles, or other applications that may benefit from improved image processing performance. Further, while the processor subsystem and CV accelerators 106A-N are illustrated on an integrated package, such as a system on a chip (SoC), other arrangements of these components are possible, such as discrete hardware elements connected by a vehicle bus, etc.

The image capture device 102 may be a visible light camera, a LiDAR sensor, a radar sensor, or any other imaging device. The image capture device 102 may include multiple sensors of the same or varying type. For instance, the image capture device 102 may include multiple visible light cameras arranged to capture a wider field of view than what a single camera is able to capture. The images from the cameras may be stitched together to form a larger input image.

A video stream, which may be decomposed into video frames, is output from the image capture device 102. Each video frame is treated as a separate image. The images are transmitted to the CV accelerators 106A-N. Each CV accelerator processes a portion of a video frame or a pre-processed video frame, according to the various embodiments described.

The CV accelerators 106A-N store the results to local memory 108A-N in the respective CV accelerator 106A-N. The local memory may be a dynamic random access memory (DRAM). Using direct memory access (DMA) or other memory transmission technique, the results are transferred from the local memories 108A-N of the respective CV accelerators 106A-N to a local memory 110 of the processor subsystem 104.

The processor subsystem 104 may include one or more processors, each with one or more cores. Additionally, the processor subsystem 104 may be disposed on one or more physical devices.

The processor subsystem 104 may operate on the results transferred from the CV accelerators 106A-N to perform various functions, including but not limited to, initiating collision avoidance mechanisms in an AV context, performing vehicle steering assistance functions, initiating navigation functions, or the like.

Figure 2:
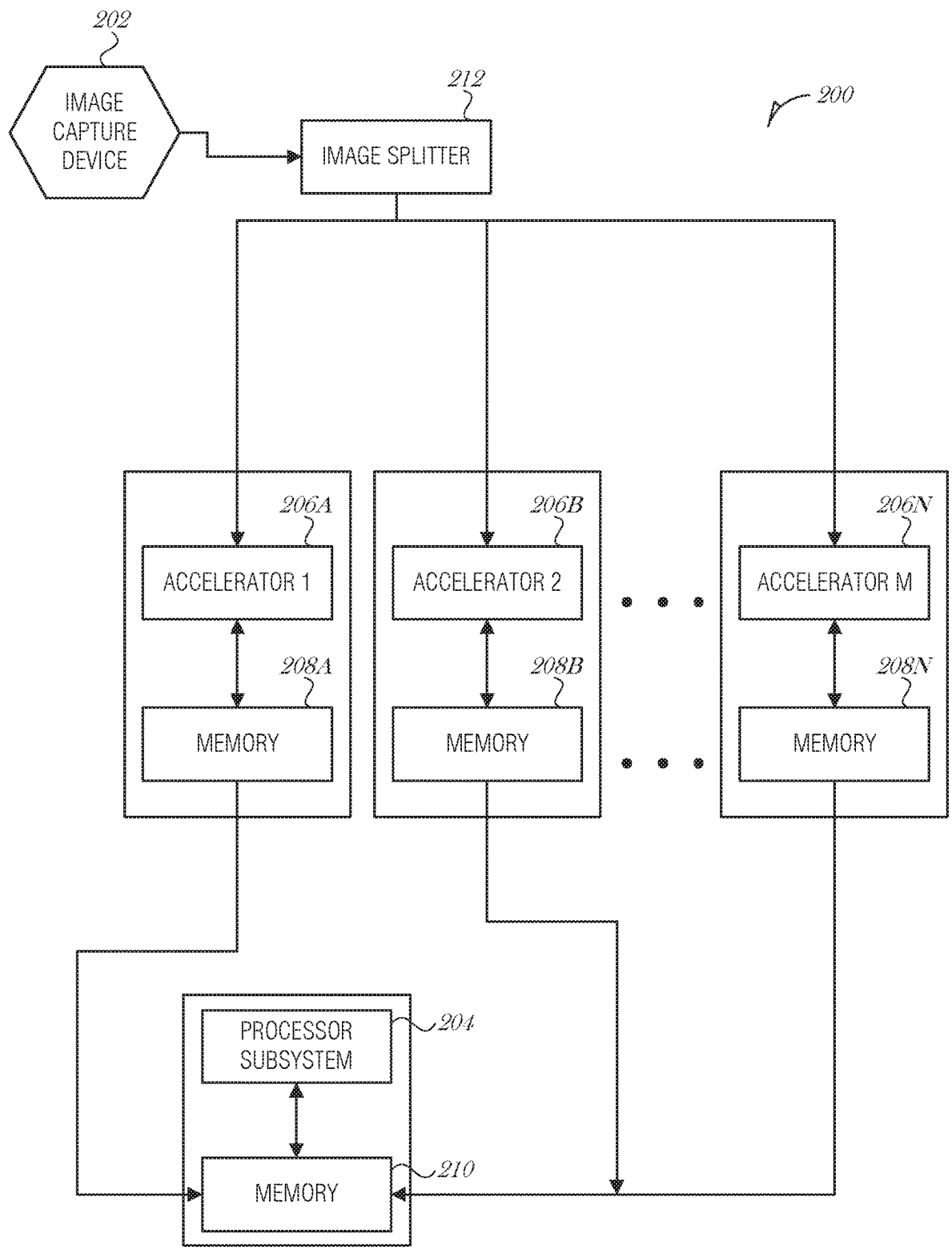
FIG. 2 is a schematic drawing illustrating another computer vision (CV) system according to an embodiment.

FIG. 2 is a schematic drawing illustrating another computer vision (CV) system 200, according to an embodiment. As with the CV system 100 illustrated in FIG. 1, the CV system 200 illustrated in FIG. 2 includes an image capture device 202, a processor subsystem 204 with associated memory 210, and a plurality of CV accelerators 206A-N with associated memories 208A-N. While three CV accelerators 206A-N are illustrated in FIG. 2, it is understood that any number of two or more CV accelerators may be used. In addition to these devices, FIG. 2 includes an image splitter 212.

The image splitter 212 receives as input a camera feed from the image capture device 202 and provides as output three identical copies of the input. The copies are output in parallel and each CV accelerator 206A-N receives full frames of the input received by the image splitter 212. The CV accelerators 206A-N are configured, adapted, programmed, or otherwise designed to process only a portion or a variant of the input image. For instance, CV accelerator 206A may downscale the image and then process the downscaled image, CV accelerator 206B may process the left portion of the image, and CV accelerator 206C may process the right portion of the image. The amount of downscaling or the amount of sub-frame processed by a CV accelerator 206A-N may vary based on the ADAS use case, object types expected for these use cases. CV algorithms running on the accelerator, or fine tuning of the algorithm settings to obtain optimal results from the execution. The fine tuning of frame processing with the algorithms to obtain optimal results may be: automated using machine learning techniques; hand coded based on experiments and results from those experiments; or manually computed using a threshold on the maximum object size being detected, and distance limit of detection and image resolution.

Downscaling may be determined based on various factors, such as maintaining a high accuracy of the system, adjusting sizes of parts to match limitations of components (e.g., CV accelerator capacity), efficient use of processing capacity, and limitations of addressable memory space by a CV accelerator, which may impact the maximum possible input size, the number of inputs to a neural network, the size of the neural network, and the like.

Figure 3:
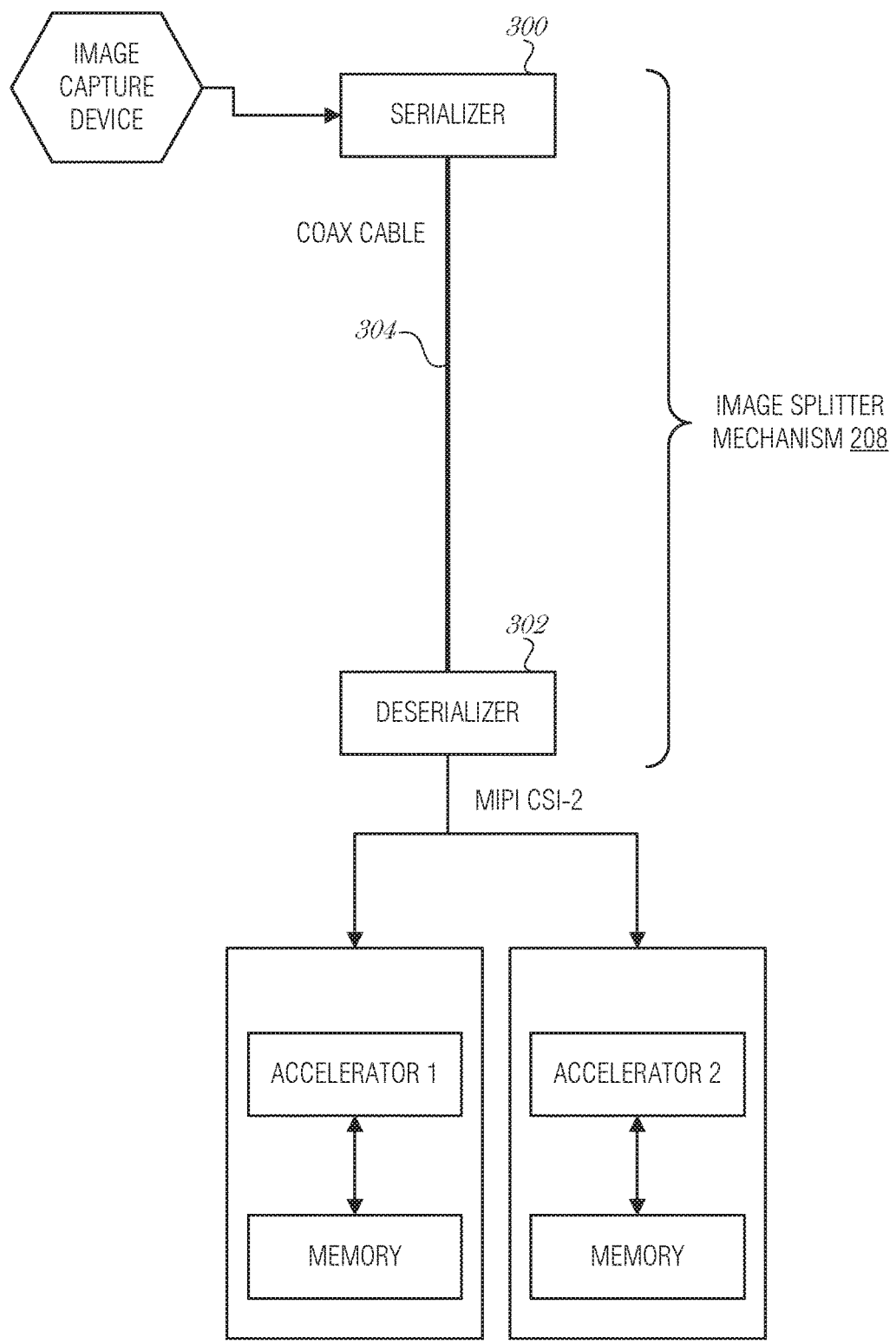
FIG. 3 illustrates a configuration of an image splitter mechanism with a serializer and deserializer using a coaxial cable transmission medium between the two.

The image splitter 212 may include several devices. For instance, a deserializer such as a Texas Instruments DS90UB960 may be used to provide two parallel MIPI CSI-2 output signals, one to each of separate CV accelerators. Additional deserializers may be used to further split the input image signal to three or more CV accelerators. To condition the input signal, a serializer, such as a Texas Instruments DS90UB953 may be used. FIG. 3 illustrates a configuration of an image splitter 212 mechanism with a serializer 300 and deserializer 302 using a coaxial cable 304 transmission medium between the two.

While some embodiments are illustrated in FIGS. 1-3, it is understood that other arrangements may be used without departing from the scope of the disclosure. In an embodiment, the same memory is used for all of the CV accelerators in a system, and the memory is shared with the CPU. For example, the memory may use the same set of chips and address space for CV accelerators and CPU(s). Using direct memory access, or other mechanisms. CV accelerators may output to the shared memory space and a CPU may act on the deposited data. For instance, an accelerator PCI-e card may address system RAM directly and deposit its output in system RAM. As another example, CV accelerators may be placed on the same board or multi-chip module with a CPU, and share memory devices.

Figure 4:
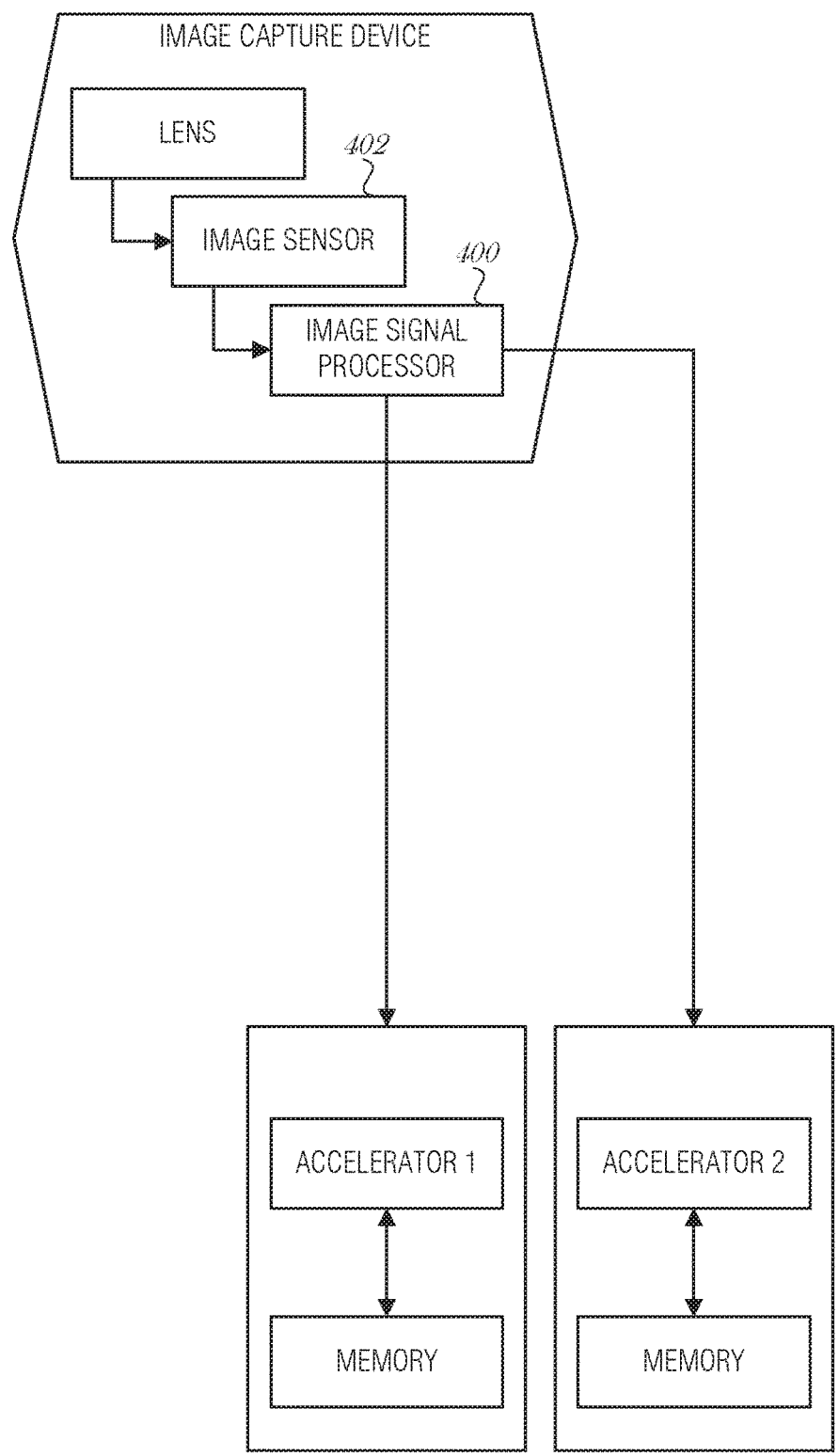
FIG. 4 is a schematic drawing illustrating another configuration of the image splitting mechanism, according to an embodiment.

FIG. 4 is a schematic drawing illustrating another configuration of the image splitting mechanism, according to an embodiment. The image splitting mechanism 400 may be integrated into an image capture device (e.g., a camera). The image splitting mechanism 400 acts as an image signal processor to pre-process the images from an image sensor 402 and output specific streams to each of the target CV accelerators. For instance, in a three-CV accelerator configuration, the image splitting mechanism 400 may downscale an image and transmit that to a first CV accelerator, process the image to separate the left 60% of the image and transmit that to a second CV accelerator, and process the image to separate the right 60% of the image and transmit that to a third CV accelerator. This provides an overlapped area of 20% of the image's width, which provides the advantages discussed below in FIGS. 5-10.

Figure 5:
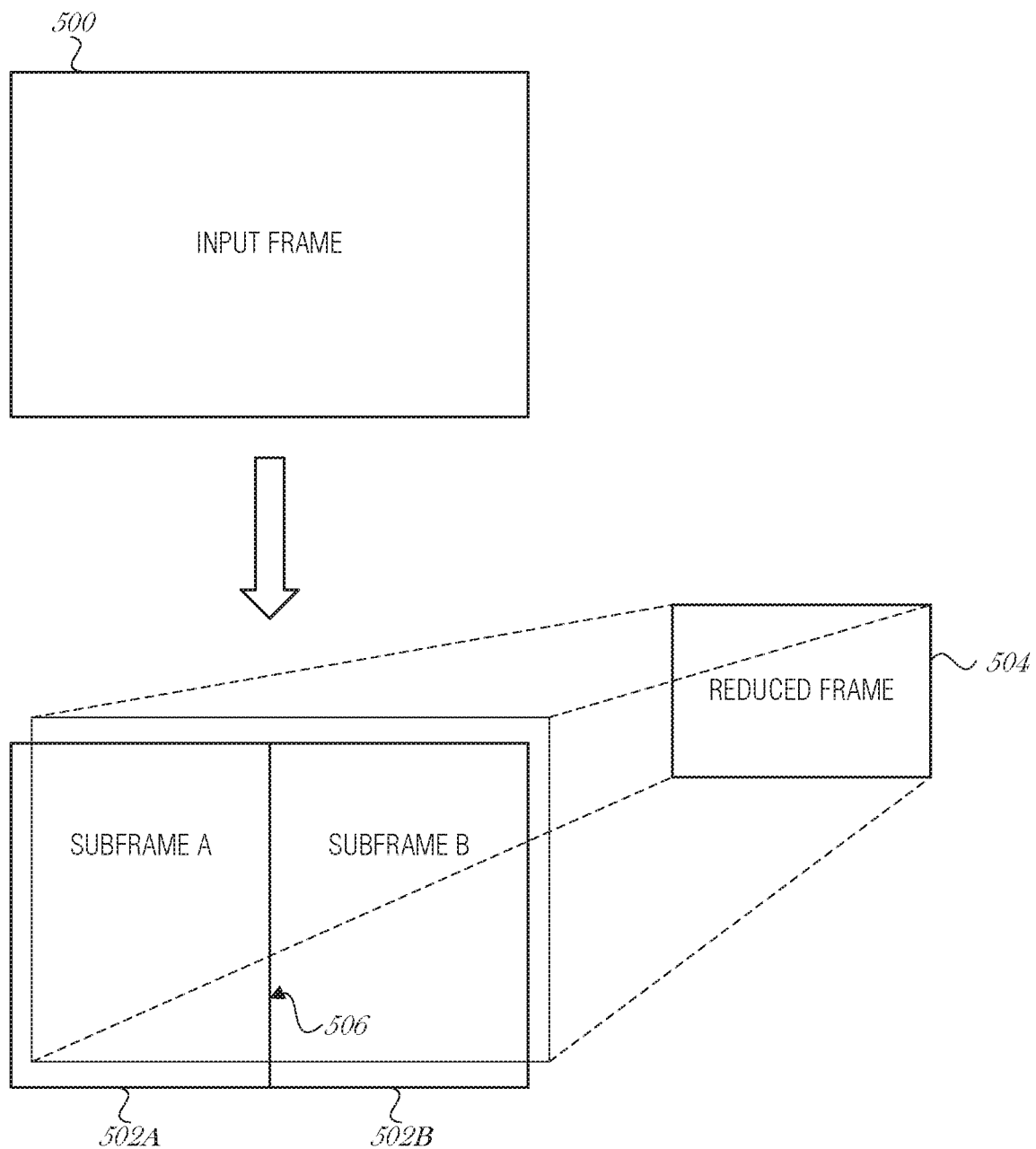
FIGS. 5-7 illustrate various split frame arrangements, according to various embodiments.
Figure 6:
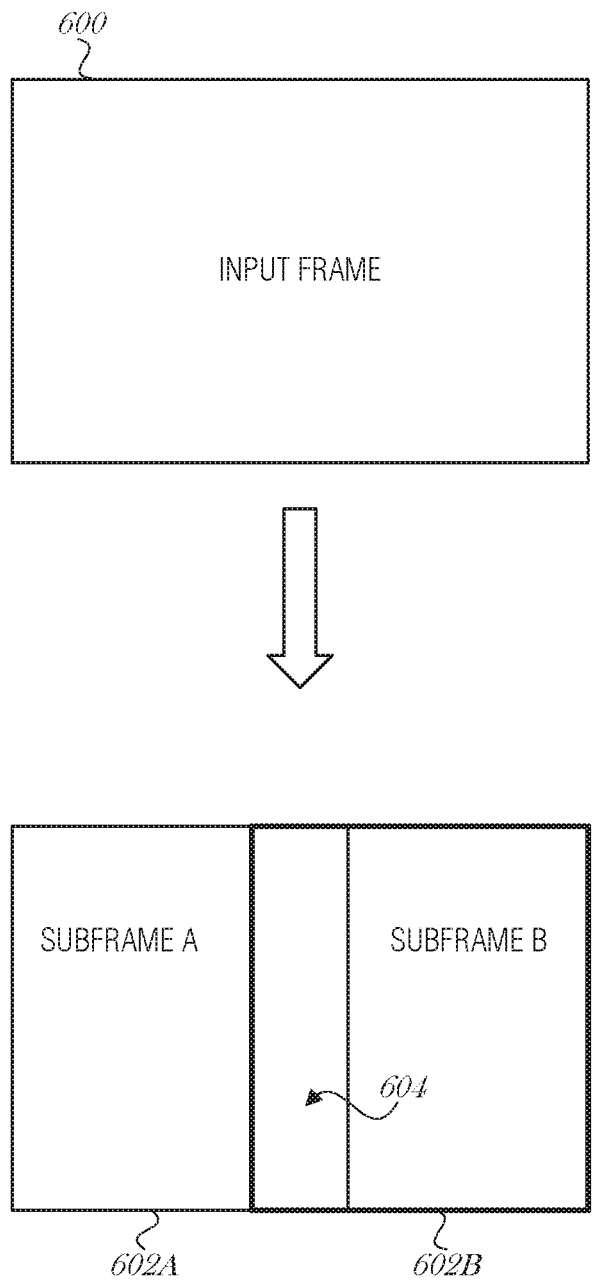
Figure 7:
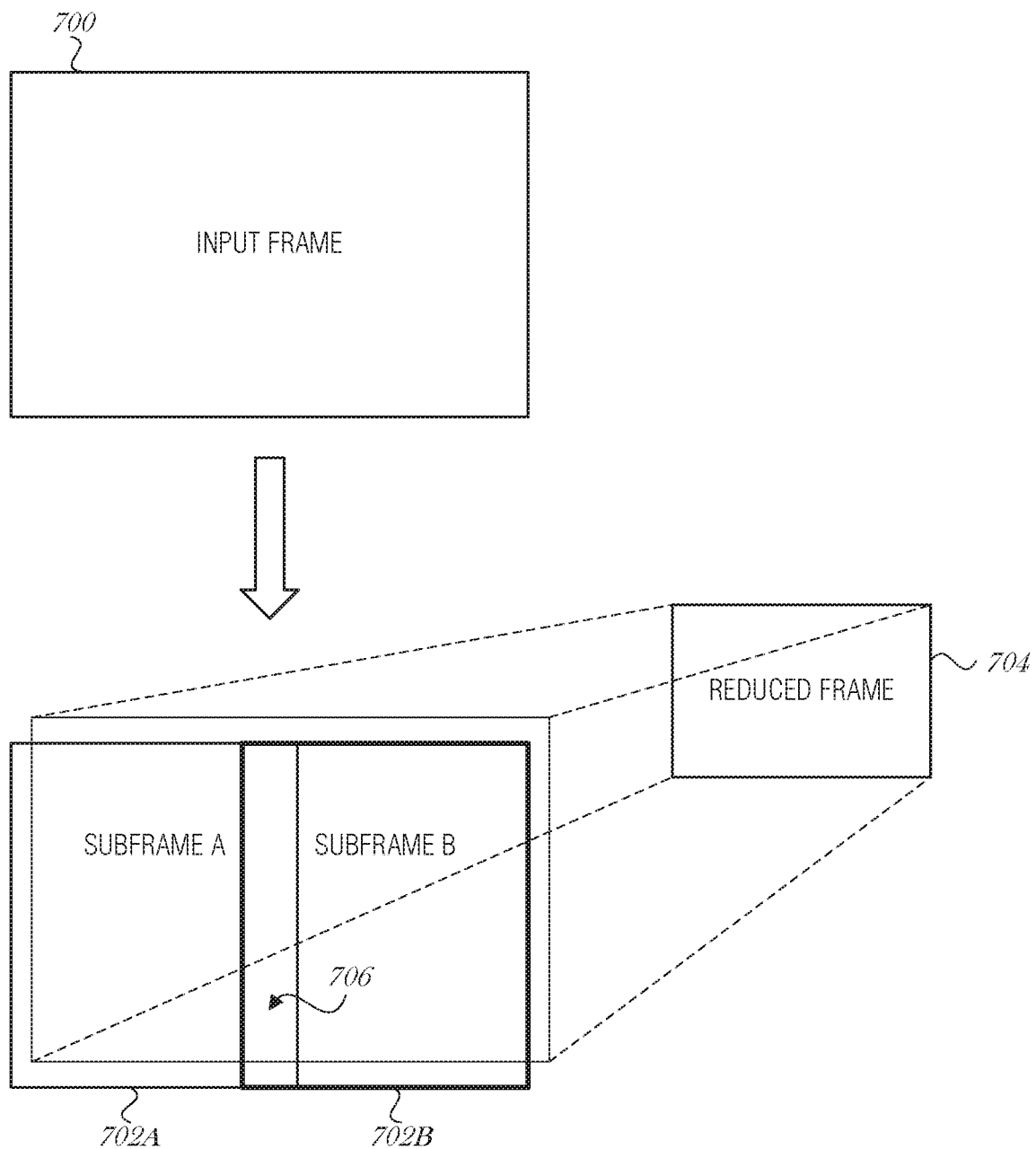

FIGS. 5-7 illustrate various split frame arrangements, according to various embodiments. In FIG. 5, an input frame 500 is split into two halves: subframe 502A and subframe 502B. Additionally, the input frame 500 is downscaled to reduced frame 504. Each of subframe 502A, subframe 502B, and reduced frame 504 are processed in parallel by three separate CV accelerators. Because each accelerator is processing a much smaller input, the total execution time for the input frame 500 is reduced. Usage of a reduced frame 504 is to detect patterns or objects that happen to be located on or near a dividing line 506 between subframe 502A and subframe 502B. For instance, when an object spans the dividing line 506, the object may not be correctly identified by either of the CV accelerators processing subframe 502A and subframe 502B.

In FIG. 6, an input frame 600 is split into two portions: subframe 602A and subframe 602B. Subframes 602A-B overlap by some amount. The use of an overlapping area 604 is to detect objects that may be missed at the dividing line, which may occur in the configuration shown in FIG. 5. As such, in FIG. 6, a reduced frame is not needed. In the implementation illustrated in FIG. 6, only two accelerators are used. This reduces manufacturing cost and die size.

The overlapping area of the subframes 602A-B may be large, for example, in the range of 40% to 60% of the width of one of the subframes 602A-B. Often, the optimal range depends on image resolution, object size, distance to the object, such that an expected pixel representation of the object in the image fits within the overlap. Greater overlap (e.g., 70%, 80%, etc.) may have marginal accuracy gains at the cost of speed depending on the object to image properties discussed. Thus, for example, with an input frame 600 of 1000 pixels wide, each subframe 602A-B may be 700 pixels wide, allowing for overlapping area 604 of 400 pixels. In such an embodiment, each accelerator only has to process a 700 pixel wide image, instead of a 1000 pixel wide image. By adjusting the size of the overlapping area 604, the implementer is able to adjust for faster processing (e.g., using smaller overlapping portions), or better accuracy (e.g., using larger overlapping portions).

The size of the overlapped area may be chosen through cross-validation on the training or validation set of images. For example, values ranging from 0% to 60% in increments of 5% may be tested, and the most accurate setting may be used in deployment.

FIG. 7 is a combination of techniques illustrated in FIGS. 5 and 6. In FIG. 7, an input frame 700 is split into two portions that overlap: subframe 702A and subframe 702B. Additionally, a reduced frame 704 (e.g., downscaled copy) of the input frame 700 is provided to a separate accelerator. The implementation provided in FIG. 7 is able to detect objects that exist at the dividing line of the subframes 702A-B, and also minimize the amount of overlapping area 706, which minimizes processing time for each subframe 702A-B. For example, the overlapping area 706 may be smaller than the overlapping area 604, because using the reduced frame 704 provides a redundant check on the overall image for objects that are not detected in the smaller overlapping area 706. The hardware arrangement is the same as that for the implementation in FIG. 5 with three accelerators.

Other splitting arrangements may be used with two, three, four, or more split portions or reduced frames. For instance, an input image may be quartered into equal subframes, with each quarter processed by a separate CV accelerator in parallel. Additionally, a reduced frame may be produced and process with the quartered portions.

As another example, the input image may be separated into three sections, a larger center section and two smaller left and right sections. The center section may overlap with one or both of the left or right sections. This may be useful in some applications where an object of interest is often found in the center of the camera's field-of-view. A reduced frame may be used in such an embodiment. Other types of partitioning, splitting, overlapping, and arrangement of the subframes are considered within the scope of this disclosure.

When considering accuracy of object detection or recognition, splitting the input frame may have some or no consequence. The following FIGS. 8-10 illustrate various splitting configurations for discussion.

Figure 8:
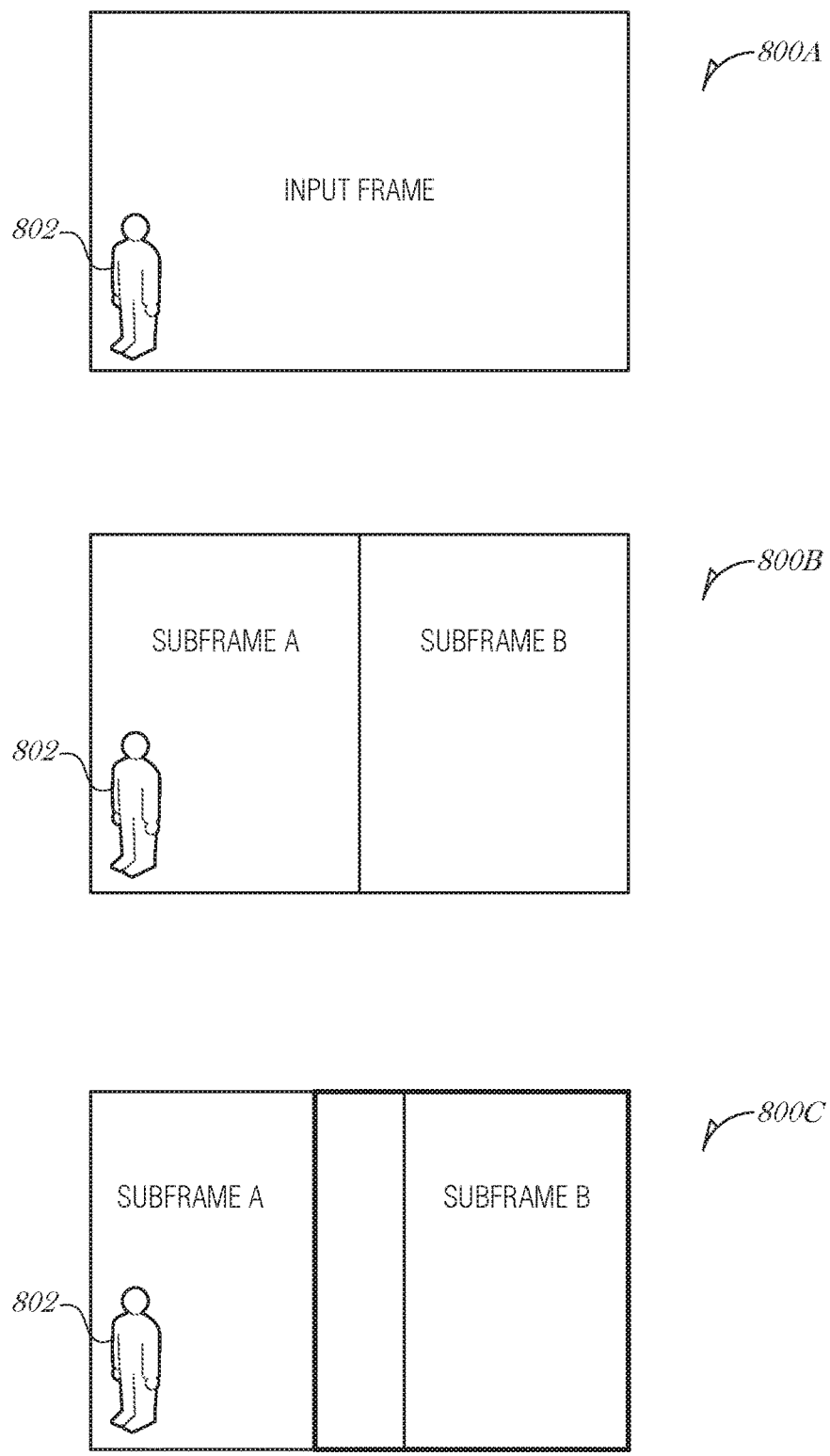
FIG. 8 is a series of frame configurations where an object of interest 802 lies in the lower corner of the input frame.

FIG. 8 is a series of frame configurations 800A-C where an object of interest 802 lies in the lower corner of the input frame. In the first frame configuration 800A, processing the input frame in the first frame configuration will produce the same object detection or recognition results as processing the left frame in the second or third frame configurations 800B-C. In this case, the third frame configuration 800C that uses an overlapping area does not provide any improvement as the accuracy will be at least as good as the configuration without any overlap because in both cases the object of interest 802 is fully represented in a single sub-frame (one of the splits of an input frame).

Figure 9:
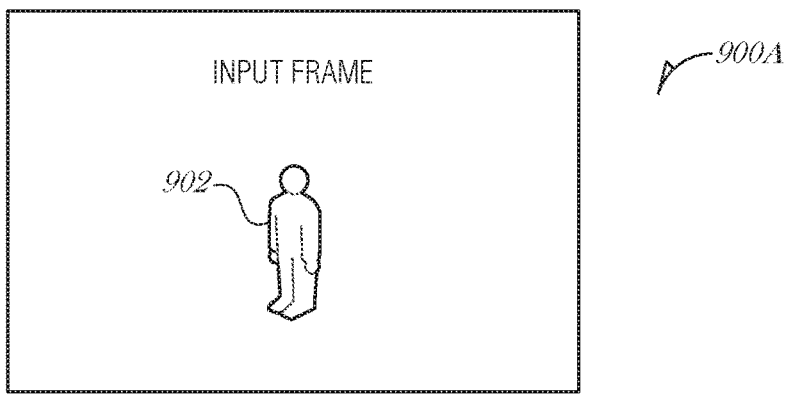
FIG. 9 is a series of frame configurations where an object of interest 902 is positioned approximately in the center of the input frame.
Figure 9:
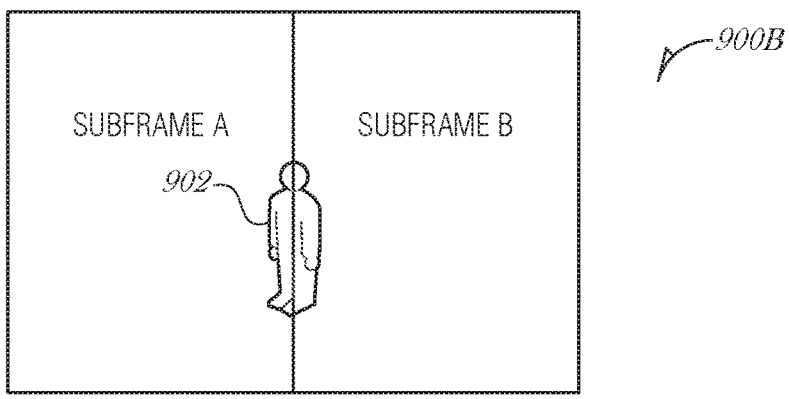
Figure 9:
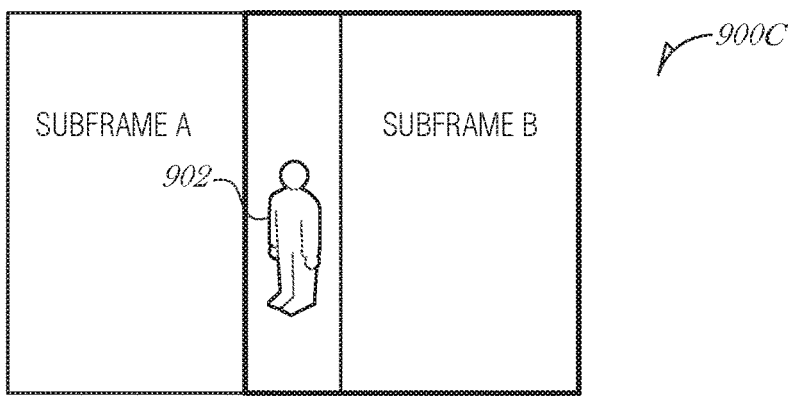

FIG. 9 is a series of frame configurations 900A-C where an object of interest 902 is positioned approximately in the center of the input frame. Here, the split with an overlap in the third frame configuration 900C actually improves on the second frame configuration 900B, which does not use an overlap. Without the overlap, the object of interest 902 is split across the left and right sub-frames in the second frame configuration 900B, and neither sub-frame includes the full object of interest 902. In contrast, in the third frame configuration 900C, each of the left and right sub-frames include the full object of interest 902, and will very likely detect it correctly. Thus, the overlapping area provides higher object detection or recognition accuracy than without an overlap.

Figure 10:
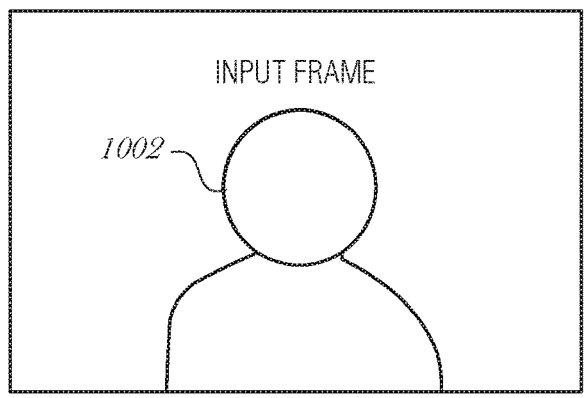
FIG. 10 is a series of frame configurations where an object of interest is positioned approximately in the center of the input frame and occupies a large area of the input frame.
Figure 10:
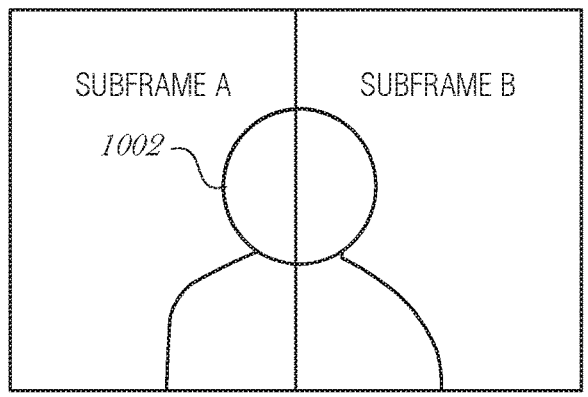
Figure 10:
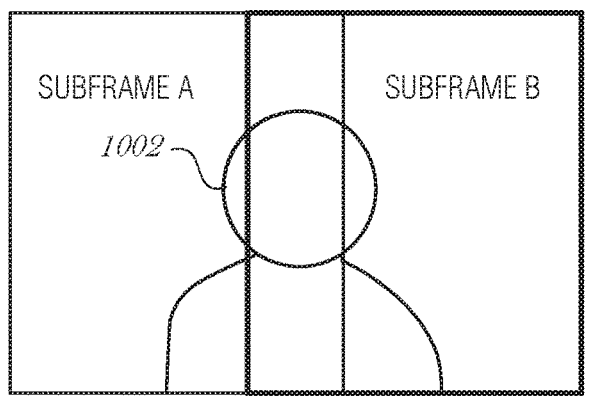

FIG. 10 is a series of frame configurations 1000A-C where an object of interest 1002 is positioned approximately in the center of the input frame 1000A and occupies a large area of the input frame. Here, again, the second frame configuration 1000B only includes a portion of the object of interest 1002, so the processing of each sub-frame of the second frame configuration 1000B may not accurately detect or recognize the object. However, the split with overlap in the third frame configuration 1000C improves the chances of detecting the object of interest 1002 due to the fact that a large portion of the object 1002 exists within each subframe.

As a result, the split with overlap method is reliable in many conditions where performing a simple split with no overlapping section is not. The amount of overlap may be adjusted based on context, continuous learning, user settings, or the like. A larger overlap increases the processing time of each sub-frame, but also increases the accuracy of object detection or recognition within a particular subframe. Regardless of the increase in processing time, because each sub-frame is processed in parallel with its respective CV accelerator, it is still faster than serially processing single frames with a single CV accelerator.

Object detection and recognition, along with other CV functions, are useful in a wide variety of applications. Examples include, but are not limited to autonomous vehicles, smartglasses for augmented reality or virtual reality, security systems, retail systems, telecommunications and teleconferencing, video game play and entertainment, and the like.

Figure 11:
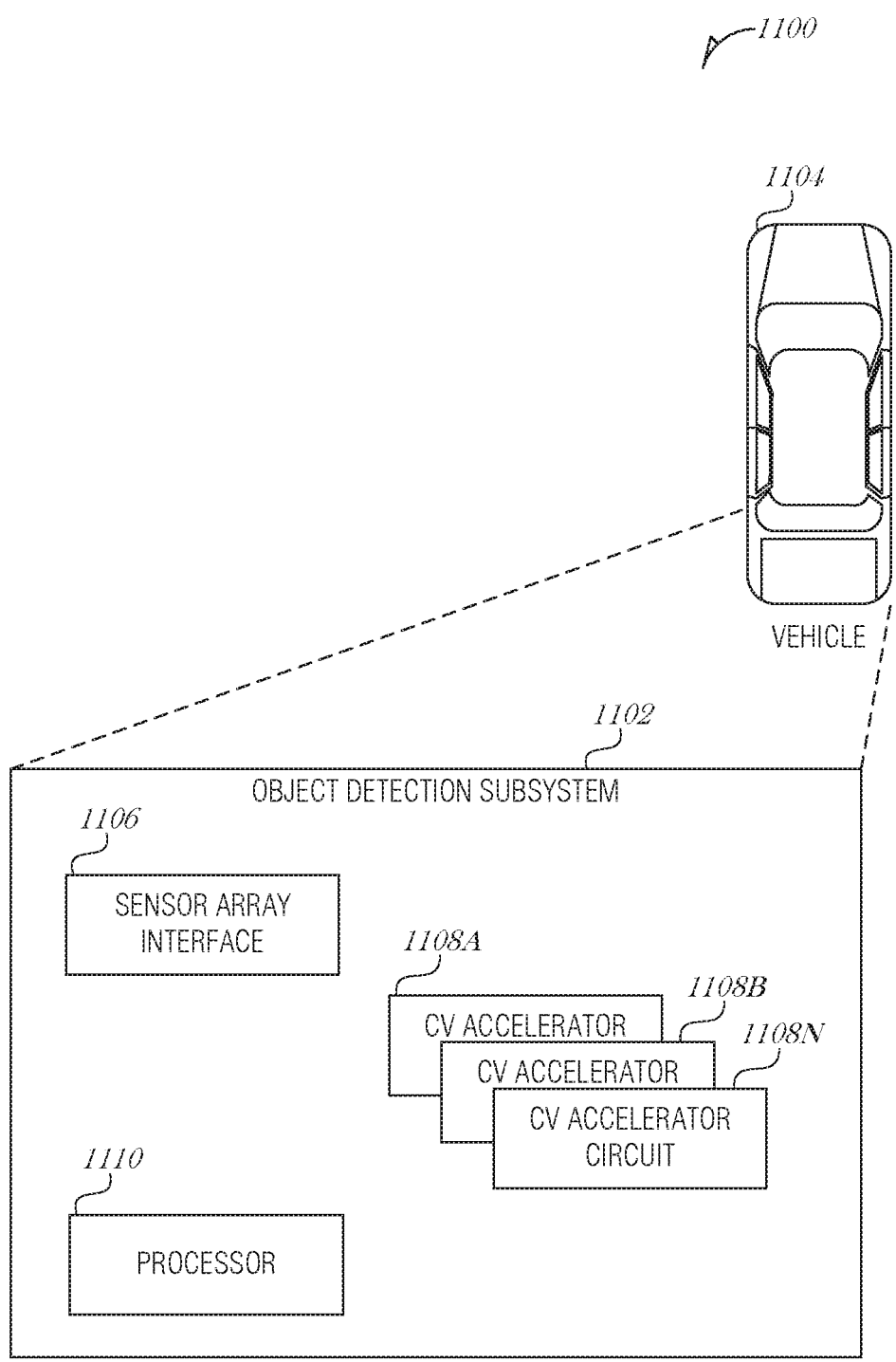
FIG. 11 is a schematic drawing illustrating a system to process information for improved computer vision, according to an embodiment.

FIG. 11 is a schematic drawing illustrating a system 1100 to process information for improved computer vision, according to an embodiment. FIG. 11 includes a computer vision (CV) subsystem 1102 incorporated into the vehicle 1104. The CV subsystem 1102 includes a sensor array interface 1106, a plurality of CV accelerator circuits 1108A-N, and a processor 1110.

The vehicle 1104 may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 1104 may operate at some times in a manual mode where the driver operates the vehicle 1104 conventionally using pedals, steering wheel, and other controls. At other times, the vehicle 1104 may operate in a fully autonomous mode, where the vehicle 1104 operates without user intervention. In addition, the vehicle 1104 may operate in a semi-autonomous mode, where the vehicle 1104 controls many of the aspects of driving, but the driver may intervene or influence the operation using conventional (e.g., steering wheel) and non-conventional inputs (e.g., voice control).

The vehicle 1104 includes a sensor array, which may include various forward, side, and rearward facing cameras, radar. LiDAR, ultrasonic, or similar imaging sensors. Forward-facing is used in this document to refer to the primary direction of travel the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle 1104. Cameras in the sensor array may include infrared or visible light cameras, able to focus at long-range or short-range with narrow or large fields of view.

The vehicle 1104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain, moisture, or the like.

Components of the CV subsystem 1102 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), coaxial cable, or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle 1104 obtains sensor data via the sensor array interface 1106 from sensors integrated in the vehicle 1104, or sensors that are communicatively coupled to the vehicle 1104. The sensors may include radar, LiDAR, visible light cameras, acoustic sensors, environmental sensors, infrared sensors, or combinations. Radar is useful in nearly all weather and longer range detection, LiDAR is useful for shorter range detection, cameras are useful for longer ranges but often become less effective in certain weather conditions, such as snow. Combinations of sensors may be used to provide the widest flexibility in varying operating conditions.

Based on the sensor data, the CV accelerator circuits 1108A-N are able to determine a list of objects detected in the respective image, or portion of an image, under analysis. Using the lists produced by the CV accelerator circuits 1108A-N, the processor 1110 sorts the lists and removes duplicates, to produce a list of detected objects in the original image frame.

Figure 12:
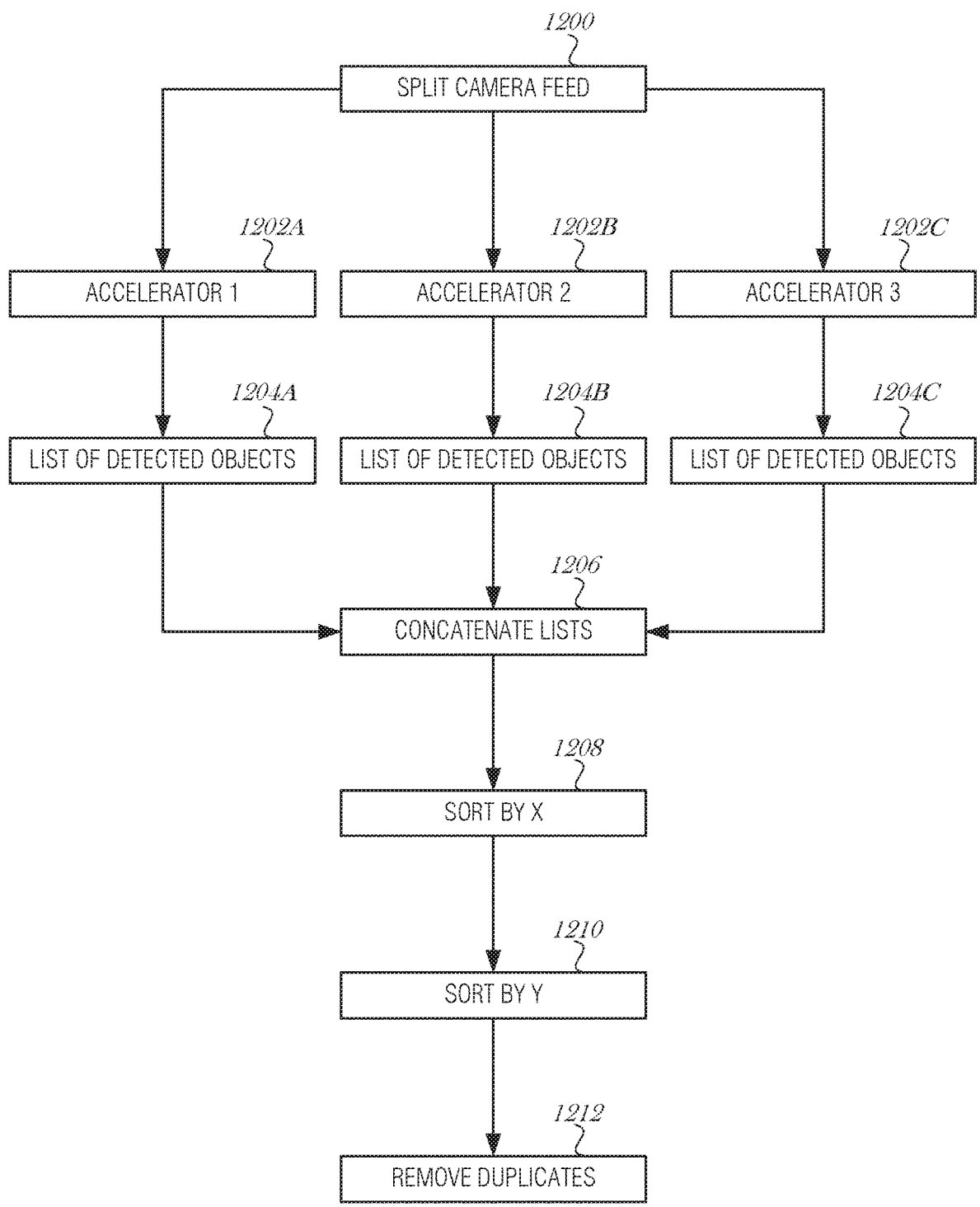
FIG. 12 is a block diagram illustrating the data and control flow according to an embodiment.

FIG. 12 is a block diagram illustrating the data and control flow according to an embodiment. The illustrated data and control flow is an implementation example of the general principle to concatenate lists of detected objects—found on the accelerators—and apply non-maximum suppression (NMS) on the result to remove duplicate object detections. In general, it doesn't matter which NMS technique is used, such as sorting by x, sorting by y, sorting by a score, etc. The example NMS implementation illustrated in FIG. 12 is an x sorting variant in which a split camera feed 1200 is provided to a number of distinct CV accelerators 1202A, 1202B, and 1202C. Although three CV accelerators are illustrated in FIG. 12, it is understood that more or fewer may be used with at least two CV accelerators. Each of the accelerators 1202A-C operate on a portion of the image from the camera feed, or a downscaled image of the input image from the camera feed. The CV accelerators 1202A-C produce respective lists of objects detected 1204A-C. The lists 1204A-C are concatenated (operation 1206). If the lists 1204A-C were remapped into a relative coordinate system for each of the portions of the split camera feed 1200, then the lists 1204A-C are remapped back to a common coordinate system of the original image. For instance, if a sub-image was reduced, coordinates will need to be multiplied by some factor. As another example, if a sub-image is a right part of an original image, then the coordinates will have to be adjusted by some x-axis offset.

The lists 1204A-C are sorted by x coordinate (operation 1208), sorted by y coordinate (operation 1210)—which optionally may only occur when there is a collision between list elements on the x coordinate—and the duplicates are removed (operation 1212). In an alternative embodiment, the concatenated list of objects is sorted in one operation on both the x and y coordinates with a comparison function. For instance, the coordinates may first be sorted on the x-axis component of the coordinates, and if the x-axis coordinates are the same, then the coordinates are sorted on the y-axis component of the coordinates. It is understood that other sort orders may be used, such as sorting first on y and then on x. As an example, to compare coordinates a and b, where a is a point with an x and y coordinate, and b is a point with an x and y coordinate, a function may be used:

```
compare (a, b) {
    if (a.x > b.x) {
        return a;
```

```
        } else if (a.x < b.x) {
            return b;
                } else {
            if (a.y > b.y) {
                return a;
            } else if (a.y < b.y) {
                return b;
            } else {
                return null;
            }
        }
    }
}
```

Object lists may be in various formats. In an embodiment, each object in the list has the form of {coordinates (x, y, w, h), Object_Class}. Object_Class is a label used to group or classify objects. The coordinates include the {x, y} pixel position of the upper left corner of the bounding box containing the object in the image's coordinates. The {w, h} refer to the object's bounding box's width and height in pixels.

Alternatively, the bounding box may be defined with {x, y, x', y'}, where {x, y} refer to the upper left corner of the bounding box and {x', y'} refer to the lower right corner of the bounding box. It is understood that other bounding box reference systems may be used.

With a coordinate system of the upper left corner of the input image having a {0, 0} x and y pixel coordinates, and x increasing as the reference moves to the right, and y increasing as the reference moves down from the corner. It is understood that other coordinate reference systems may be used, in which case, the sort order may be changed from ascending to descending, or vice versa.

Once the objects are sorted—e.g., there is a sorted list of objects detected in the frame with their associated bounding boxes—overlapping bounding boxes that are pointing to the same result or object detections may be coalesced. This technique operates similarly to noise filtering or suppression to remove redundant detections. Again, NMS provides several techniques to implement this filtering. For example, an overlap threshold (for example more than 50% overlap) may be defined and set for the overlapping bounding boxes. The previous sorting operation enables these overlapping bounding boxes to remain adjacent to each other. The process may continue by checking all the adjacent overlapping bounding boxes. If these bounding boxes belong to the same object class, the bounding boxes are coalesced. If not, then the bounding boxes represent different objects and remain separate.

Figure 13:
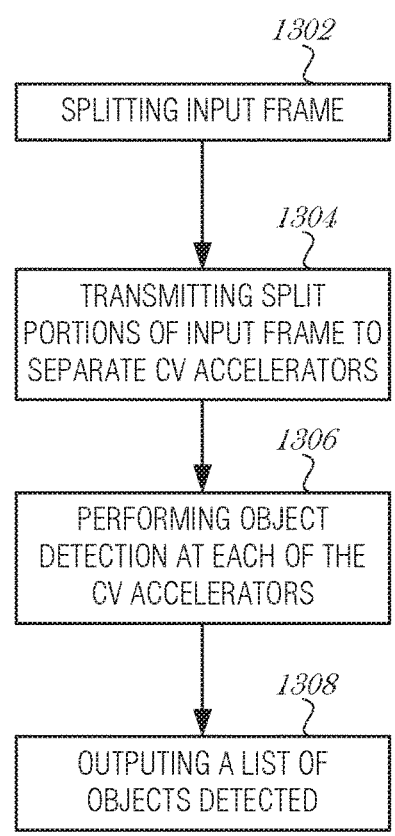
FIG. 13 is a flowchart illustrating a method for improved computer vision, according to an embodiment.

FIG. 13 is a flowchart illustrating a method 1300 of object detection, according to an embodiment. At 1302, an input frame is split into a plurality of portions.

At 1304, the plurality of portions are transmitted to a plurality of computer vision accelerators, each computer vision accelerator to process only one of plurality of portions.

At 1306, an object detection process is performed on the plurality of portions at each of the computer vision accelerators.

At 1308, a list of objects detected in each of the computer vision accelerators is output.

In a further embodiment, the method 1300 includes providing a scaled-down version of the input frame to another computer vision accelerator, the another computer vision accelerator distinct from the plurality of computer vision accelerators. The method 1300 may also include performing the object detection process on the scaled-down version to produce a list of objects detected in the scaled-down version.

In an embodiment, splitting the input frame is performed by splitting the input frame into two parts of equal size with an overlapping area. In a further embodiment, the two parts are each at least 55%. In another embodiment, the two parts are each no more than 75%.

In an embodiment, the method 1300 includes organizing the list of objects detected in each of the computer vision accelerators. In a further embodiment, organizing the list of objects is performed by: sorting the list of objects and removing duplicate entries in the list of objects. In a further embodiment, sorting the list of objects is performed by sorting the list of objects based on coordinates of bounding boxes that contain objects in the list. In another embodiment, removing duplicate entries in the list of objects is performed by comparing bounding boxes of adjacent entries, and replacing entries with similar bounding boxes with a replacement bounding box.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 14:
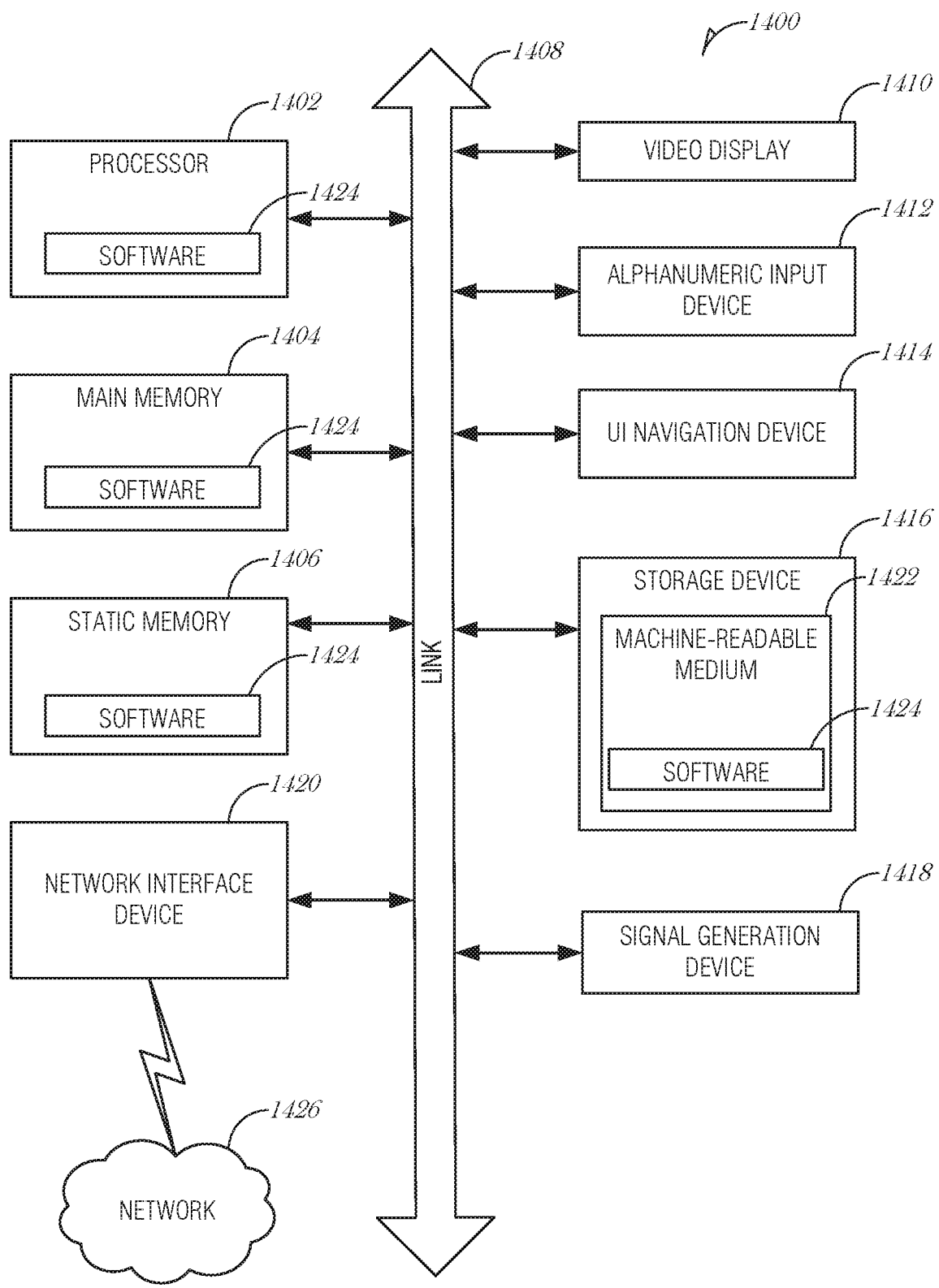
FIG. 14 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 14 is a block diagram illustrating a machine in the example form of a computer system 1400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1400 includes at least one processor 1402 (e.g., a central processing unit (CPU), a graphics processing unit (GPU) or both, processor cores, compute nodes, etc.), a main memory 1404 and a static memory 1406, which communicate with each other via a link 1408 (e.g., bus). The computer system 1400 may further include a video display unit 1410, an alphanumeric input device 1412 (e.g., a keyboard), and a user interface (UI) navigation device 1414 (e.g., a mouse). In one embodiment, the video display unit 1410, input device 1412 and UI navigation device 1414 are incorporated into a touch screen display. The computer system 1400 may additionally include a storage device 1416 (e.g., a drive unit), a signal generation device 1418 (e.g., a speaker), a network interface device 1420, and one or more sensors (not shown), such as a global positioning system (GPS) sensor, compass, accelerometer, gyrometer, magnetometer, or other sensor.

The storage device 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404, static memory 1406, and/or within the processor 1402 during execution thereof by the computer system 1400, with the main memory 1404, static memory 1406, and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions 1424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1424 may further be transmitted or received over a communications network 1426 using a transmission medium via the network interface device 1420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an object detection system, the system comprising: a plurality of computer vision accelerators to process a respective plurality of portions of an input image and produce a list of detected objects in the respective plurality of portions of the input image; and a processor subsystem to: combine the list of detected objects from each of the plurality of computer vision accelerators, to produce a combined list of detected objects; sort the combined list of detected objects; and remove duplicate entries in the combined list of detected objects to produce an output list of detected objects.

In Example 2, the subject matter of Example 1 includes, wherein the plurality of computer vision accelerators includes a computer vision accelerator to process a scaled-down version of the input image and produce a list of detected objects in the scaled-down image.

In Example 3, the subject matter of Examples 1-2 includes, wherein one portion of the input image comprises a left portion and another portion of the input image comprises a right portion of the input image.

In Example 4, the subject matter of Example 3 includes, wherein the left portion and the right portion include an overlapping area of the input image.

In Example 5, the subject matter of Example 4 includes, wherein the left portion and the right portion are each at least 55% of the input image.

In Example 6, the subject matter of Examples 4-5 includes, wherein the left portion and the right portion are each no more than 75% of the input image.

In Example 7, the subject matter of Examples 1-6 includes, wherein to sort the combined list of detected objects, the processor subsystem is to sort the combined list based on coordinates of bounding boxes that contain detected objects in the combined list.

In Example 8, the subject matter of Examples 1-7 includes, wherein to remove duplicate entries in the combined list of detected objects, the processor subsystem is to compare bounding boxes of adjacent entries, and replace entries with similar bounding boxes with a replacement bounding box.

Example 9 is a method of object detection, the method comprising: splitting an input frame into a plurality of portions; transmitting the plurality of portions to a plurality of computer vision accelerators, each computer vision accelerator to process only one of plurality of portions; performing an object detection process on the plurality of portions at each of the computer vision accelerators; and outputting a list of objects detected in each of the computer vision accelerators.

In Example 10, the subject matter of Example 9 includes, providing a scaled-down version of the input frame to another computer vision accelerator, the another computer vision accelerator distinct from the plurality of computer vision accelerators; and performing the object detection process on the scaled-down version to produce a list of objects detected in the scaled-down version.

In Example 11, the subject matter of Examples 9-10 includes, wherein splitting the input frame comprises splitting the input frame into two parts of equal size with an overlapping area.

In Example 12, the subject matter of Example 11 includes, wherein the two parts are each at least 55%.

In Example 13, the subject matter of Examples 11-12 includes, wherein the two parts are each no more than 75%.

In Example 14, the subject matter of Examples 9-13 includes, organizing the list of objects detected in each of the computer vision accelerators.

In Example 15, the subject matter of Example 14 includes, wherein organizing the list of objects comprises: sorting the list of objects; and removing duplicate entries in the list of objects.

In Example 16, the subject matter of Example 15 includes, wherein sorting the list of objects comprises sorting the list of objects based on coordinates of bounding boxes that contain objects in the list.

In Example 17, the subject matter of Examples 15-16 includes, wherein removing duplicate entries in the list of objects comprises comparing bounding boxes of adjacent entries, and replacing entries with similar bounding boxes with a replacement bounding box.

Example 18 is at least one machine-readable medium, including instructions for object detection, which when executed on a machine, cause the machine to perform the operations comprising: splitting an input frame into a plurality of portions; transmitting the plurality of portions to a plurality of computer vision accelerators, each computer vision accelerator to process only one of plurality of portions; performing an object detection process on the plurality of portions at each of the computer vision accelerators; and outputting a list of objects detected in each of the computer vision accelerators.

In Example 19, the subject matter of Example 18 includes, providing a scaled-down version of the input frame to another computer vision accelerator, the another computer vision accelerator distinct from the plurality of computer vision accelerators; and performing the object detection process on the scaled-down version to produce a list of objects detected in the scaled-down version.

In Example 20, the subject matter of Examples 18-19 includes, wherein splitting the input frame comprises splitting the input frame into two parts of equal size with an overlapping area.

In Example 21, the subject matter of Example 20 includes, wherein the two parts are each at least 55%.

In Example 22, the subject matter of Examples 20-21 includes, wherein the two parts are each no more than 75%.

In Example 23, the subject matter of Examples 18-22 includes, organizing the list of objects detected in each of the computer vision accelerators.

In Example 24, the subject matter of Example 23 includes, wherein organizing the list of objects comprises: sorting the list of objects; and removing duplicate entries in the list of objects.

In Example 25, the subject matter of Example 24 includes, wherein sorting the list of objects comprises sorting the list of objects based on coordinates of bounding boxes that contain objects in the list.

In Example 26, the subject matter of Examples 24-25 includes, wherein removing duplicate entries in the list of objects comprises comparing bounding boxes of adjacent entries, and replacing entries with similar bounding boxes with a replacement bounding box.

Example 27 is an apparatus for object detection, the apparatus comprising: means for splitting an input frame into a plurality of portions; means for transmitting the plurality of portions to a plurality of computer vision accelerators, each computer vision accelerator to process only one of plurality of portions; means for performing an object detection process on the plurality of portions at each of the computer vision accelerators; and means for outputting a list of objects detected in each of the computer vision accelerators.

In Example 28, the subject matter of Example 27 includes, means for providing a scaled-down version of the input frame to another computer vision accelerator, the another computer vision accelerator distinct from the plurality of computer vision accelerators; and means for performing the object detection process on the scaled-down version to produce a list of objects detected in the scaled-down version.

In Example 29, the subject matter of Examples 27-28 includes, wherein the means for splitting the input frame comprise means for splitting the input frame into two parts of equal size with an overlapping area.

In Example 30, the subject matter of Example 29 includes, wherein the two parts are each at least 55%.

In Example 31, the subject matter of Examples 29-30 includes, wherein the two parts are each no more than 75%.

In Example 32, the subject matter of Examples 27-31 includes, means for organizing the list of objects detected in each of the computer vision accelerators.

In Example 33, the subject matter of Example 32 includes, wherein the means for organizing the list of objects comprise: means for sorting the list of objects; and means for removing duplicate entries in the list of objects.

In Example 34, the subject matter of Example 33 includes, wherein the means for sorting the list of objects comprise means for sorting the list of objects based on coordinates of bounding boxes that contain objects in the list.

In Example 35, the subject matter of Examples 33-34 includes, wherein the means for removing duplicate entries in the list of objects comprise means for comparing bounding boxes of adjacent entries, and replacing entries with similar bounding boxes with a replacement bounding box.

Example 36 is at least one machine-readable medium including instructions that, when executed by processing circuitry, cause the processing circuitry to perform operations to implement of any of Examples 1-35.

Example 37 is an apparatus comprising means to implement of any of Examples 1-35.

Example 38 is a system to implement of any of Examples 1-35.

Example 39 is a method to implement of any of Examples 1-35.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An object detection system, the system comprising:
a plurality of computer vision accelerator circuits to process a respective plurality of portions of an input image and produce a list of detected objects in the respective plurality of portions of the input image; and
a processor subsystem to:
combine the list of detected objects from each of the plurality of computer vision accelerator circuits, to produce a combined list of detected objects;
sort the combined list of detected objects based on locations of the detected objects in the input image; and
remove duplicate entries in the combined list of detected objects to produce an output list of detected objects.

2. The system of claim 1, wherein the plurality of computer vision accelerator circuits includes a computer vision accelerator circuit to process a scaled-down version of the input image and produce a list of detected objects in the scaled-down image.

3. The system of claim 1, wherein one portion of the input image comprises a left portion and another portion of the input image comprises a right portion of the input image.

4. The system of claim 3, wherein the left portion and the right portion include an overlapping area of the input image.

5. The system of claim 4, wherein the left portion and the right portion are each at least 55% of the input image.

6. The system of claim 4, wherein the left portion and the right portion are each no more than 75% of the input image.

7. The system of claim 1, wherein to sort the combined list of detected objects, the processor subsystem is to sort the combined list based on coordinates of bounding boxes that contain detected objects in the combined list.

8. The system of claim 1, wherein to remove duplicate entries in the combined list of detected objects, the processor subsystem is to compare bounding boxes of adjacent entries, and replace entries with similar bounding boxes with a replacement bounding box.

9. A method of object detection, the method comprising:
splitting an input frame into a plurality of portions;
transmitting the plurality of portions to a plurality of computer vision accelerator circuits, each computer vision accelerator circuit to process only one of the plurality of portions;
performing an object detection process on the plurality of portions at each of the computer vision accelerator circuits;
outputting a list of objects detected in each of the computer vision accelerator circuits;
sorting the list of objects based on locations of the objects in the input frame; and
removing duplicate entries in the list of objects.

10. The method of claim 9, further comprising:
providing a scaled-down version of the input frame to another computer vision accelerator circuit, the another computer vision accelerator circuit distinct from the plurality of computer vision accelerator circuits; and
performing the object detection process on the scaled-down version to produce a list of objects detected in the scaled-down version.

11. The method of claim 9, wherein splitting the input frame comprises splitting the input frame into a first part and a second part, the first and second parts of equal size with an overlapping area.

12. The method of claim 11, wherein the first and second parts are each at least 55% of the input frame.

13. The method of claim 11, wherein the first and second parts are each no more than 75% of the input frame.

14. The method of claim 9, wherein sorting the list of objects comprises sorting the list of objects based on coordinates of bounding boxes that contain objects in the list.

15. The method of claim 9, wherein removing duplicate entries in the list of objects comprises comparing bounding boxes of adjacent entries, and replacing entries with similar bounding boxes with a replacement bounding box.

16. At least one non-transitory machine-readable medium, including instructions for object detection, which when executed on a machine, cause the machine to perform the operations comprising:
splitting an input frame into a plurality of portions;
transmitting the plurality of portions to a plurality of computer vision accelerator circuits, each computer vision accelerator circuit to process only one of the plurality of portions;
performing an object detection process on the plurality of portions at each of the computer vision accelerator circuits;
outputting a list of objects detected in each of the computer vision accelerator circuits;
sorting the list of objects based on locations of the objects in the input frame; and
removing duplicate entries in the list of objects.

17. The at least one non-transitory machine-readable medium of claim 16, further comprising:
providing a scaled-down version of the input frame to another computer vision accelerator circuit, the another computer vision accelerator circuit distinct from the plurality of computer vision accelerator circuits; and
performing the object detection process on the scaled-down version to produce a list of objects detected in the scaled-down version.

18. The at least one non-transitory machine-readable medium of claim 16, wherein splitting the input frame comprises splitting the input frame into a first part and a second part, the first and second parts of equal size with an overlapping area.

19. The at least one non-transitory machine-readable medium of claim 18, wherein the first and second parts are each at least 55% first and second.

20. The at least one non-transitory machine-readable medium of claim 18, wherein the first and second parts are each no more than 75% first and second.

21. The at least one non-transitory machine-readable medium of claim 16, wherein sorting the list of objects comprises sorting the list of objects based on coordinates of bounding boxes that contain objects in the list.

* * * * *